United States Patent [19]

Furness et al.

[11] 4,226,714
[45] Oct. 7, 1980

[54] THICKENER CONTROL SYSTEM

[75] Inventors: Kenneth M. Furness; Manuel Quinonez; Stanley T. Low, all of Tucson, Ariz.

[73] Assignee: The Anaconda Company, New York, N.Y.

[21] Appl. No.: 973,758

[22] Filed: Dec. 27, 1978

[51] Int. Cl.² .................. B01D 21/01; B01D 21/06
[52] U.S. Cl. ............................. 210/723; 210/104; 210/738; 210/740; 210/744; 210/805; 210/96.1
[58] Field of Search ............. 210/83, 84, 73 W, 73 S, 210/73 R, 104, 96, 101, 42, 49

[56] References Cited

U.S. PATENT DOCUMENTS

| | | | |
|---|---|---|---|
| 1,140,131 | 5/1915 | Dorr | 210/83 |
| 3,208,592 | 9/1965 | Smith | 210/101 X |
| 3,664,951 | 5/1972 | Armstrong | 210/96 X |
| 3,834,529 | 9/1974 | Hart | 210/96 R |
| 4,040,954 | 8/1977 | Chandler | 210/96 R |
| 4,151,080 | 4/1979 | Zuckerman | 210/96 R |

Primary Examiner—John Adee
Attorney, Agent, or Firm—Pennie & Edmonds

[57] ABSTRACT

The present invention is directed to a method and apparatus for maintaining steady state conditions in a separator. Steady state is maintained by controlling mass flow rates of influent to, and underflow from the separator. Specifically, an influent specific gravity and flow rate signals are monitored by an influent mass flow controller. That controller responds to variation in these signals to maintain a constant mass feed rate into the separator. A mass flow signal, comprising a composite of influent specific gravity and influent mass flow signals, is produced. That signal is fed to a thickener controller which also monitors mass flow of the underflow. The thickener controller adjusts the mass flow rate of the underflow in response to the influent mass flow signal. However, fluctuation of an interface level between clear and unclear areas of the thickener can effect flow rate adjustment. The purpose of such an override is correction for errors in the mass control signal as well as for changes in flocculant feed rate. This invention can be adapted to operate a system containing multiple solid-liquid separation devices.

17 Claims, 2 Drawing Figures

THICKENER CONTROL SYSTEM

TECHNICAL FIELD

The present invention relates in general to solid-liquid separation and can be utilized in a number of industrial processes such as chemical, mineral, coal, sugar, steel, clay, industrial waste, water purification, nuclear, food, agricultural and power generation processes.

BACKGROUND ART

Separating suspended solids from an impure influent by addition of a flocculating agent to obtain a clear liquor overflow discharge is conventional. More particularly, it is common practice to supply an impure influent feed to a separator tank. During the separation process, a clear liquid overflow is withdrawn from the top of the tank and a concentrated slurry containing separated solids is withdrawn from the bottom as an underflow. To effect a clear overflow, a flocculating agent is added to the feed to facilitate flocculation and precipitation of suspended particles. Consequently, impure influent is separated into a large volume of clear overflow and a small volume of underflow having a high solids content.

A sedimentation device within the purview of the subject invention comprises a large diameter cylindrical vessel with a vertical axis into which a turbid liquid feed is deposited. A fast throughput type separator is particularly useful in the practice of the subject invention. That separator is designed so that a pretreated contaminated influent, an influent to which is added a flocculating agent, is introduced at a controlled velocity in a horizontal direction in an active sludge bed within the separator. That introduction results in the elimination of a free settling zone. Particles move randomly through the sludge bed in the separator, promoting additional agglomeration, which results in accelerated settling. Rakes aid the compaction of settled solids while moving them to the discharge area. Use of such separators advantageously results in a sharp interface between the sludge bed and clarified effluent.

This separator operates in a manner similar to those previously described. Influent is introduced into the center of the unit. A vertical feed pipe extends into the unit and is faced by a baffle plate forcing influent to enter in a horizontal direction. The gap between the baffle plate and the end of the feed pipe determines the velocity with which the feed is introduced into the sludge bed. Alternatively, side inlet or bottom inlet units can be used to feed from above or below the separator. Solids collect in the bottom of the unit where rotating rakes move them to a centrally located outlet from which they are discharged. A clarified overflow is discharged from the top over a circumferential overflow weir.

The necessity for pretreatment depends on the chemical characteristics of the solid concentration, particle size and particle characteristics of the influent. In most applications, conditioning of the feed consists of simply adding an agglomerating or flocculating agent to the feed. Deaeration, pH adjustment, addition of a second agglomerating agent, and variation of reaction times are also available for pretreating the influent.

Use of multiple sedimentation devices is also within the purview of the subject invention. A countercurrent decantation technique can be employed in the operation of multiple units. Simply, this technique utilizes addition of wash solution to the last separator and advancing the resulting overflow upstream countercurrent, that is opposite, to the flow of underflow solids. Specifically, a liquid-solid feed is introduced at one end of a line of separators, and a clear weak wash solution is introduced at the other end. The solids go from the bottom of one separator to the top of the next toward the separator where the wash solution enters. A clear solution overflows from one separator to the next but in a direction opposite to the movement of the solids. This results in a very dense underflow being discharged from the last separator. Thus, an overflow product issues from the first separator; a solid residue underflow issues from the last separator. The main idea is to get the sludge as thick as possible while keeping the overflow clear.

For efficient treatment of influent, mass flow rate into and out from the separator should be maintained at constant rates to remove the bulk of the solids from the influent while permitting a clear overflow. Further, the feed rate of solids must balance the solids discharge rate.

Conventionally, feed rates were controlled manually using visual observation of the underflow and the overflow. Adjustments based on such observations resulted in a see-saw operation to maintain an essentially balanced control over the separator. Such an operation is particularly troublesome in countercurrent decantation operations. Thus, accurate control of the feed rate into and out of the separator is important to maintain steady state conditions. Moreover, for manual operation to meaningfully minimize disruptive effects produced by fluctuations of numerous process variables, such operation would necessitate use of an excessive number of operators. This approach is commercially prohibitive in view of the labor expenses involved. Furthermore, lack of continuity in adjustments to correct for fluctuations of process variables tends to upset optimum operating conditions for the sedimentation operation. Also, the rather erratic and unpredictable occurrences of such disruptive factors in the process upset the stabilization of the operation.

In addition to the enumerated shortcomings generally associated with manual operation, other drawbacks exist. Practically, manual operators attempting to achieve stabilization often overcompensate for disruptive effects. Such overcompensation tends to produce additional disruptions or surges throughout sedimentation systems using multiple separators, thereby attenuating disruptions to steady state operation. Consequently, an efficient and trouble-free operation is commercially impossible to achieve with manual operation.

In the mining industry, control of a separation process can be critical for efficient recovery of valuable metals like copper, molybdenum and uranium. Loss of such metals to tailings is uneconomical. Consequently, advances in the art of liquid-solid separation involving control of separator operation has commercial significance.

U.S. Pat. No. 3,208,592 to Smith discloses a method for controlling hydroseparators. Such a separator is a thickener having a means for introducing a backwash fluid near an underflow discharge. A control system is taught which coordinates overflow and underflow discharges. Specifically, an influent and wash liquid are continuously introduced into the thickener. A constant density of discharging underflow solids is maintained by controlling the volume discharged. Overflow rate is maintained constant by controlling introduction of the wash liquid. Because the density of the underflow discharge is maintained constant and because the amount of backwash liquid varies proportionally with the flow rate of the discharge, the flow rate of backwash liquid is controlled by maintaining that rate in a constant ratio to the flow rate of the discharge.

DISCLOSURE OF INVENTION

Broadly, it is an object of the present invention to improve upon prior art methods for controlling sedimentation processes. Toward this end, there is provided a simple, reliable method of continuously controlling a sedimentation operation to maintain steady state conditions.

The system contemplated for continuously maintaining a substantial steady state condition in such operation includes at least one separation apparatus into which flows an impure influent. A clear liquor overflows from the top and a sludge exits from the bottom of the apparatus. Influent and underflow flow rates are controlled. Specifically, the flow rate and specific gravity of the influent are monitored. Those process variables signal an influent mass flow controller which in turn adjusts the flow rate of the influent to a desired value via a valve means. That controller also sends a mass flow signal to a second or thickener mass flow controller. It monitors the flow rate and specific gravity of the underflow and also monitors the interface level in the separator. The thickener controller adjusts the underflow flow rate via a valve means in response to the mass flow signal. Fluctuations in the level of the interface can prompt the thickener controller to adjust the underflow flow rate differently from that dictated by the mass flow signal emanating from the influent controller.

BRIEF DESCRIPTION OF THE DRAWINGS

The above, as well as other objects, features and advantages of the present invention will become readily apparent upon reading a detailed description of the present invention when viewed in conjuction with the drawings.

BEST MODE FOR CARRYING OUT THE INVENTION

Figure 1:
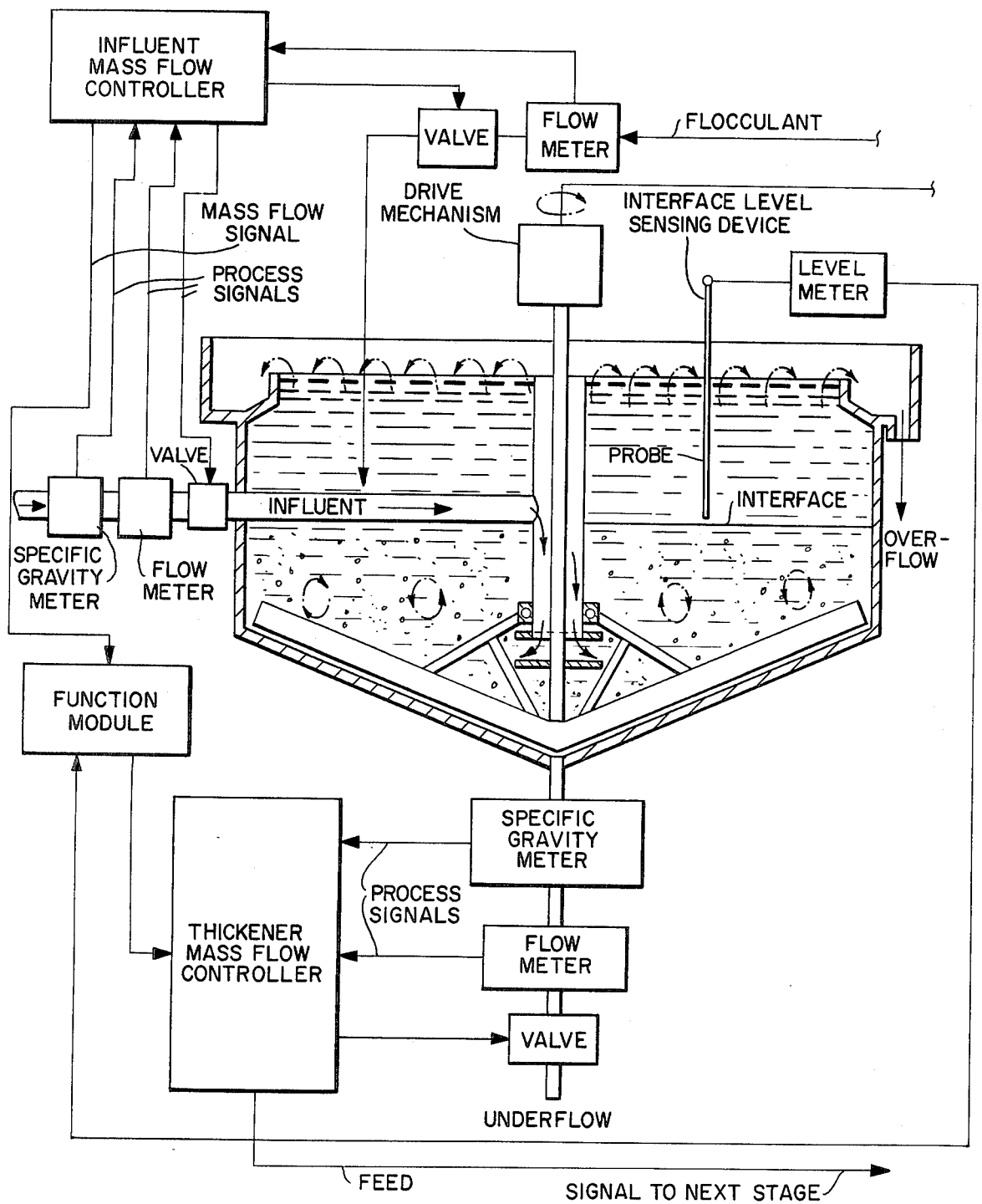
FIG. 1 is a flow-sheet showing control of a fast throughput type separator.

Referring to FIG. 1, it represents in schematic form a separation system embodying the principles of the subject invention. Such a system is customarily utilized in an industrial ore separation process involving recovery of metallic particles from the ore.

In particular, a fast-throughput type separation apparatus is depicted and controlled according to the tenor of the subject invention. The separator has a conventional design. During separation an interface forms where agglomerated solids and clear solution meet. A rake mechanism drives settled solids to a central bottom portion. Those solids exit as underflow.

The remainder of the schematic of FIG. 1 is directed to a control system for the subject invention. The system includes analog, digital, pneumatic, hydraulic type devices and combinations thereof. An influent mass flow controller is shown which monitors and controls the flow rate of the influent. Conventional specific gravity and flow rate metering devices are located on the influent line and send process signals to the influent mass flow controller. Controller output will modulate a conventional valve means located on the influent line to maintain a constant flow of dry solids. The flow rate at which the controller permits the influent to enter the separator is determined mainly by the capacity of a storage area for the influent. This flow rate comprises a set point in the influent controller which may be adapted to accommodate fluctuations in the demand of the system.

Specific gravity and flow rate signals are conditioned in the function module to supply a mass flow signal. The signals are fed through a function module and then through a set point of a thickener mass flow controller which controls the flow rate of underflow using valve means depicted in the schematic of FIG. 1. Under normal or steady state operations, the function module will permit the mass flow signal to pass unaltered to the thickener mass flow controller. The purpose of the influent and thickener flow controllers is to maintain a constant mass flow into and out of the separator. Such control permits a constant, predetermined tonnage of dry solids to be maintained in the thickener.

The thickener mass flow controller monitors two process variables. Specific gravity and flow rate meters on the underflow line feed these process signals to the controller. A third signal is derived from monitoring the interface level in the tank. That level is monitored using a conventional interface level sensing device. The device has a probe which senses the level of the interface. Signals from the probe are fed to the thickener mass flow controller.

Regarding control of flocculant feed rate, it is monitored on a flow meter and is controlled automatically, all shown in FIG. 1. Flocculant is used to aid the settling of the solids to the bottom of the thickener yielding a clear overflow solution and an underflow having a desired specific gravity. Flocculant over-usage causes a clearer overflow, but also causes a higher than needed underflow specific gravity. The interface level probably will be lower than desired resulting in the plugging of the underflow line. Those conditions create excessive torque on the rake drive mechanism making it shut down. Under-usage of flocculant causes the specific gravity of the underflow to be lower than desired and can, in turn, yield a dirty overflow. This condition may also produce a higher than desired interface level. Typically, the concentration of the flocculant is about 0.5 percent by weight of a water solution.

The rake drive mechanism is equipped with a pressure transmitter and pressure switches (not shown). The thickener flow control monitors torque pressure on the rake mechanism. A recorder (not shown) continuously records torque pressure. A control (not shown) is included for raising or lowering the rake.

Figure 2:
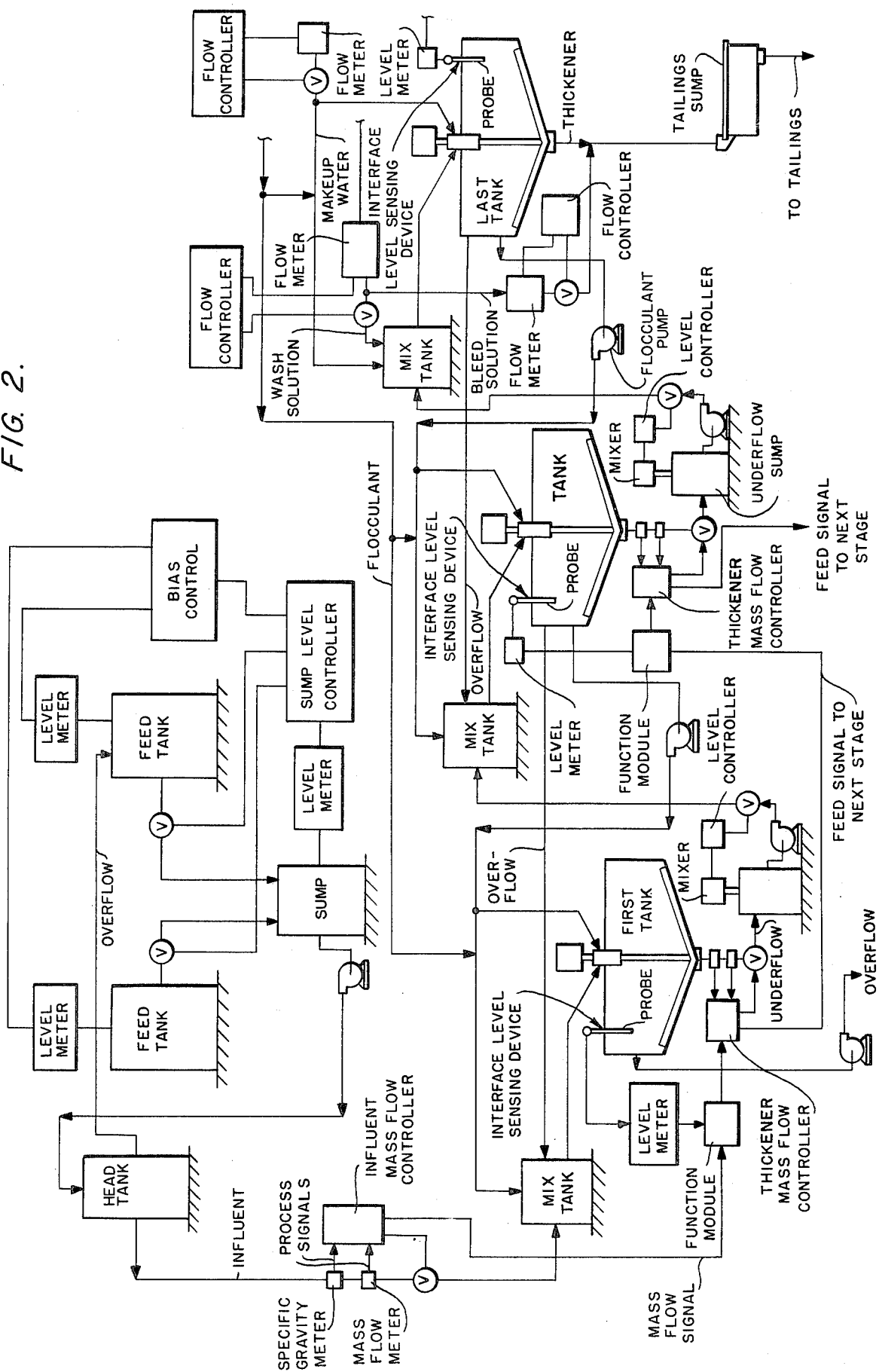
FIG. 2 is another flow-sheet depicting the utilization of the control processes shown in FIG. 1 in a multiple separator operation utilizing a countercurrent decantation technique.

FIG. 2 illustrates the operation of a system containing multiple separation units. Each separation unit and attendant controls have been detailed in FIG. 1. Because it would be repetitive to show a control system for each tank in view of FIG. 1 and because such a depiction would unnecessarily clutter FIG. 2, the control system for the last tank has been omitted. For lack of space, the specific gravity and flow meters on the underflow line from the first tank and from the tank adjacent to it have not been labeled.

A countercurrent decantation technique is used. A typical application involves separation of dissolved uranium from solids contained in the sludge. This is accomplished by adding wash solution to the last separator and advancing the resultant overflow upstream countercurrent and opposite to the flow of the sludge underflow. The overflow from the first separator would contain a solution pregnant with uranium. The sludge in the last stage separator is pumped to tailings.

As shown in FIG. 2, the control system for the first tank is the same as that shown for the separator in FIG. 1. Similarly, the operation of that system is the same. A feed signal is sent from the thickener mass flow controller of the first tank to a function module of an adjacent tank. Under normal operation, the module will permit the signal to pass unaltered to thickener mass flow controller of the adjacent tank. The module monitors the interface level in the tank using a conventional interface level sensing device. Like the device shown in FIG. 1, a probe senses the level of the interface. Signals from the probe are fed to the function module. Fluctuation of the interface level can affect the signal sent to the mass flow controller. The controller monitors specific gravity and flow rate on the underflow line using meters shown in FIG. 2. The controller can modulate a valve on the underflow line to maintain a constant mass flow from the adjacent tank coordinate with the mass flow from the first tank.

The first thickener, and consequently the entire system, is fed from a feed storage system. The system comprises multiple storage tanks which discharge into a sump. Sump slurry is pumped to a head tank. That tank stores influent for the entire system and contains an overflow connected to the storage tanks. When fluid level in the head tank reaches a level higher than desired, an alarm will sound and fluid will overflow into an adjacent tank.

The storage tanks have sonic level transmitters to detect fluid level. Level signals will be sent to a recorder (not shown) to monitor tank level. Alarms are incorporated to indicate when the level has reached either 25 or 75% of the capacity of a tank. Discharge of the storage tanks is controlled by a feed storage tank sump level controller. A conventional bias control is used to keep fluid levels in the tanks the same.

The sump level will be monitored by a level transmitter producing signal fed to a sump level controller. The sump level controller output modulates a valve means on the feed storage tank discharges. The controller output is fed directly to a tank discharge valve, and to the bias control.

The flow rate of wash solution is measured by a magnetic flow meter. This signal is sent to a flow controller which modulates a valve means on the flow line to maintain a constant flow rate. Deviation alarms are incorporated. Wash solution is also bled to tailings. The bleed flow rate is measured by a magnetic flow meter, which signals a controller. It controls a valve to establish a constant bleed flow rate. This controller will have deviation alarms. Wash solution and bleed flow rates are recorded. Make-up water will be measured, controlled and recorded in the same manner as the bleed flow.

Underflow from each thickener will be discharged into a sump. From the sump, the solids will be pumped to the next thickener. As previously mentioned, solids from the last thickener are discharged into a tailing sump. On each sump there will be a level transmitter which sends a signal to a sump level controller. Its output modulates a control valve on the pump discharge. The level in the sump should be controlled at about 50% of the capacity of the sump. Separator underflow is then pumped to a mix tank for a subsequent separator where it is diluted with overflow from a separator preceding it. As shown in FIG. 2, flocculent can be added directly or indirectly to separators. Flocculent can be supplied from an external source (not shown) or obtained by withdrawing it from a separator using the flocculent pump labeled in the drawing.

All flow rates are indicated in tons per hour. The dry solids flow will be indicated in tons per hour, other flow rates are shown in volume per unit tons.

Based upon the foregoing description of the subject invention, there is provided a control method and apparatus to automatically and continuously offset disruptive effects of process variables. The present invention is simple, convenient, reliable and economic.

While the invention has been described in connection with the preferred embodiments, it is not intended to limit the scope of the invention to the particular forms set forth above, but on the contrary, it is intended to cover such alternatives, modifications and equivalents which can be encompassed within the spirit and scope of the invention as defined by the appended claims.

We claim:

1. A method for controlling a liquid-solid separation process in which an interface is formed so that substantially steady state operation is maintained comprising steps for:
    (a) feeding a contaminated liquid-solid influent into a first separator;
    (b) withdrawing a substantially clear liquid overflow and a substantially solid contaminant underflow therefrom;
    (c) metering specific gravity and flow rate of the liquid-solid influent;
    (d) adjusting mass flow rate in response to fluctuations in the metered parameters of step (c) to maintain a desired substantially constant mass flow rate of liquid-solid influent into the separator;
    (e) metering specific gravity and flow rate of the substantially solid contaminant underflow;
    (f) adjusting mass flow rate of the substantially solid-contaminant underflow according to the adjustment of step (d);
    (g) monitoring an interface level between clear and unclear areas of the separator; and
    (h) correcting the adjustment of step (f) according to fluctuations of the interface level.

2. The method of claim 1 including pretreatment of the influent feed.

3. The method of claim 2 where pretreatment includes addition of a flocculating agent.

4. The method of claim 1 wherein influent is force fed horizontally into the separator beneath the interface level.

5. The method of claim 1 further comprising:
    (n) storing the contaminated influent feed in multiple storage tanks; and
    (o) maintaining substantially identical fluid levels in the tanks while withdrawing contaminated influent feed therefrom.

6. The method of claim 1 further comprising:
    (i) mixing substantially clear liquid overflow from another separator with the substantially solid contaminant underflow from the first separator;

(j) feeding this liquid-solid contaminant mixture to the other separator;

(k) withdrawing substantially solid contaminant underflow from the other separator;

(l) metering specific gravity and flow rate of the substantially solid contaminant underflow from the other separator;

(m) adjusting mass flow rate of the underflow from the other separator in response to fluctuations in the metered parameters of step (1) and in response to adjustments in step (f) to maintain a desired substantially constant mass flow rate of underflow from the other separator which coordinates with the mass flow rate of the substantially solid contaminant underflow of the first separator;

(n) monitoring an interface level between clear and unclear areas of the other separator; and (o) correcting the adjustment of step (m) according to fluctuations of the interface level in the other separator.

7. The method of claim 6 wherein wash solution is bled to tailings.

8. The method of claim 6 wherein makeup water is mixed with the underflow from the separator of claim 1.

9. The process of claim 6 further comprising adding a constant flow of wash solution to the other separator.

10. The process of claim 6 further comprising sending the substantially solid contaminant underflow to tailings.

11. In an apparatus for controlling liquid-solid separation in a separator including a feed means, a means for withdrawing a substantially clear liquid overflow, and a means for withdrawing a substantially solid underflow wherein the improvement comprises:

(a) specific gravity and flow rate meters connected to the feed means;

(b) influent mass flow control means connected to the meters and to a control means for maintaining a substantially constant mass feed rate to the separator;

(c) a thickener mass flow control means connected to the influent mass flow control means, to other specific gravity and flow rate meters connected to the underflow means and to another control means connected to the underflow means for maintaining a substantially constant flow rate from the underflow means; and (d) an interface level metering means for monitoring clear and unclear areas in the separator connected to the thickener mass flow control means;

whereby substantially steady state operation is maintained during the liquid-solid separation by adjusting the influent control means and underflow control means in response to fluctuations in influent specific gravity, influent flow rate and interface level to maintain a substantially constant dry solids content in the separator.

12. The improvement of claim 11 where a portion of the feed means is located below the interface level and includes a baffle at its extremity disposed to horizontally distribute liquid-solid influent.

13. The improvement of claim 11 including a pretreatment means for the liquid-solid influent.

14. The improvement of claim 11 including interconnected multiple separators.

15. The improvement of claim 11 including influent storage tanks connected to a sump which, in turn, is connected to a head tank and control means for maintaining substantially equal levels in the storage tanks while influent is deposited in the sump and fed to the feed means through the head tank which is connected to the feed means.

16. The improvement of claim 11 including a function module means connected to the influent mass flow control means, the thickener mass flow control means, and the interface level metering means.

17. The improvement of claim 11 including a rotating rake in the separator.

* * * * *